United States Patent [19]

Diefendorf et al.

[11] Patent Number: 4,970,639

[45] Date of Patent: Nov. 13, 1990

[54] VIRTUAL MACHINE ARCHITECTURE INDEPENDENT PROGRAM LOADER

[75] Inventors: Richard L. Diefendorf; Joel A. Farrell, both of Endicott; George N. Kustas, Poughkeepsie; George V. Madl, III, Vestal; Frank M. Nesgoda, Highland, all of N.Y.

[73] Assignee: International Business Machines Corporation, Armonk, N.Y.

[21] Appl. No.: 196,237

[22] Filed: May 20, 1988

[51] Int. Cl.$^5$ .................... G06F 9/445; G06F 9/455; G06F 12/02

[52] U.S. Cl. .................... 364/200; 364/900; 364/232.1; 364/232.3; 364/228.2; 364/254.8; 364/254.9; 364/280; 364/927.81; 364/948.1; 364/978; 364/951.5

[58] Field of Search ... 364/200 MS File, 900 MS File, 364/300

[56] References Cited

U.S. PATENT DOCUMENTS

| | | | |
|---|---|---|---|
| 4,200,915 | 4/1980 | Struger et al. | 364/900 |
| 4,432,053 | 2/1984 | Gaither et al. | 364/200 |
| 4,449,181 | 5/1984 | Young et al. | 364/200 |
| 4,466,063 | 8/1984 | Segarra et al. | 364/200 |
| 4,516,199 | 5/1985 | Frieder et al. | 364/200 |
| 4,521,846 | 6/1985 | Scalzi et al. | 364/200 |
| 4,626,986 | 12/1986 | Mori | 364/200 |

Primary Examiner—Michael R. Fleming
Assistant Examiner—Gopal C. Ray
Attorney, Agent, or Firm—Whitham & Marhoefer

[57] ABSTRACT

A program loader for virtual machine (VM) operating systems (OS) for computer and data processing systems permits the loading and execution of programs in different virtual machine environments, depending on addressing and residency requirements of the programs. An improved subsystem to the VM operating system contains command language and file management capability that allows programs to be invoked via a direct branch linkage in the addressing mode of the target program, allows the program's addressing mode and residency mode to be dynamically and interactively overridden at any point in the load process, controls whether previously loaded programs remain in storage along with the program that is currently being loaded, and allows the loading and execution of programs that are architecturally dependent as well as programs that have no architecture dependencies.

16 Claims, 8 Drawing Sheets

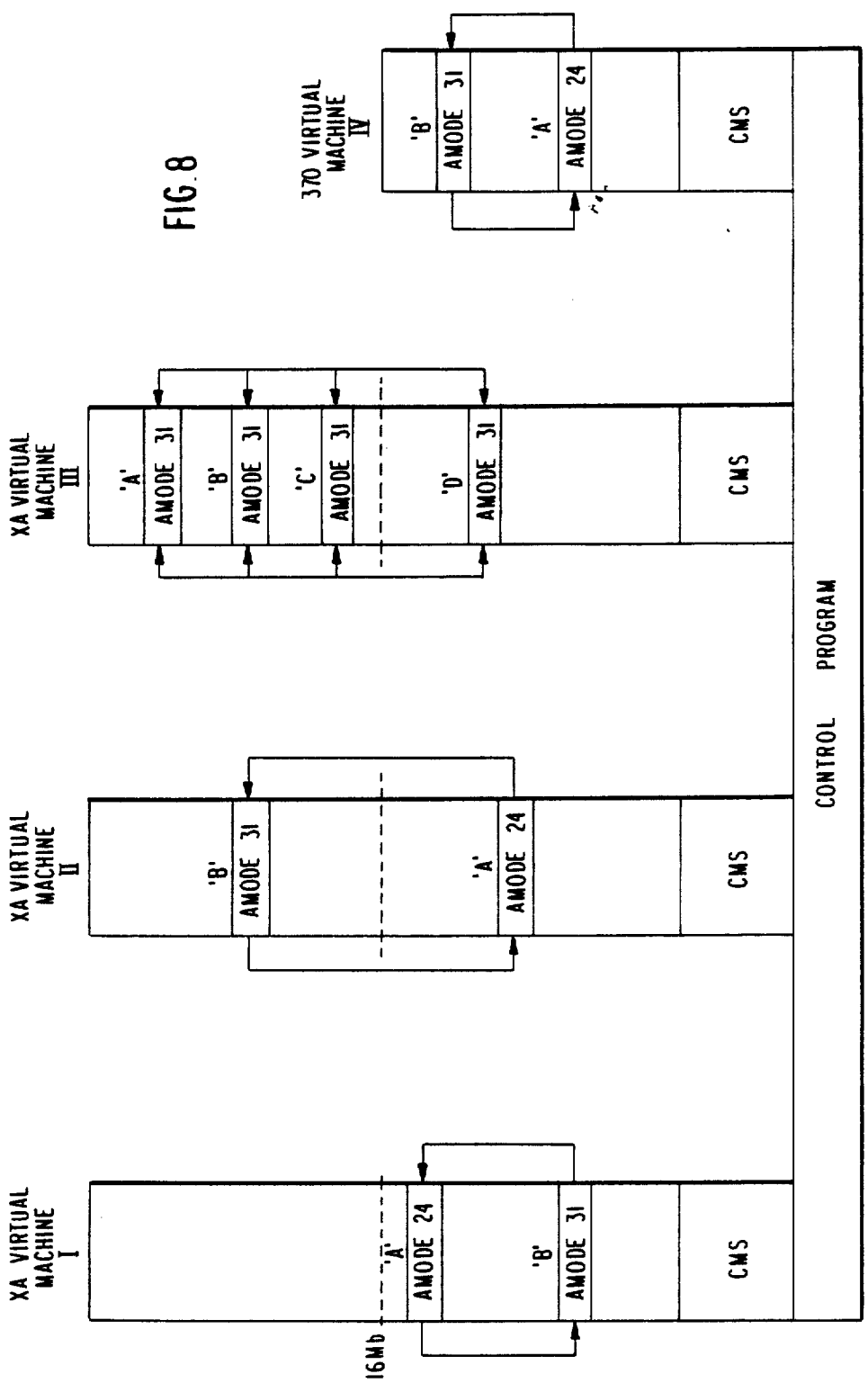

VIRTUAL MACHINE ARCHITECTURE INDEPENDENT PROGRAM LOADER

BACKGROUND OF THE INVENTION

1. Field of the Invention

The present invention generally relates to virtual machine (VM) operating systems (OS) for computer and data processing systems and, more particularly, to an improved subsystem to the VM operating system containing command language and file management capability that allows programs to be invoked via a direct branch linkage in the addressing mode of the target program, allows the program's addressing mode and residency mode to be dynamically and interactively overridden at any point in the load process, controls whether previously loaded programs remain in storage along with the program that is currently being loaded, and allows the loading and execution of programs that are architecturally dependent as well as programs that have no architecture dependencies.

2. Description of the Prior Art

The basic concept of a virtual machine is the provision of a base on which different operating systems can share a computer or data processing system and logically behave as if each is the only operating system running on the computer or data processing system. The most widely used virtual machine (VM) system is VM/SP which manages an IBM System 370 (S/370) family of computers.

In order to support a plurality of users on the virtual machine operating system, it is common to provide a subsystem containing command language and file management capability. Such a subsystem is IBM's Conversational Monitor System (CMS) for the VM/SP. CMS is a disk oriented operating system that gives the user complete access to what appears to be a dedicated real machine. Thus, while a CMS user sees a dedicated virtual machine, VM/SP provides a multiuser timesharing environment by supporting many separate CMS virtual machines. A general description of VM/SP and CMS may be had with reference to H. Lorin and H. M. Deitel, *Operating Systems*, Addison-Wesley (1981), Chapter 16, "Virtual Machines", and H. M. Deitel, *An Introduction to Operating Systems*, Addison-Wessley (1984), Chapter 22, "VM: A Virtual Machine Operating System".

The IBM S/370 architecture provides 24-bit addressing and limited virtual storage for a single user to 16Mb. Recently, the S/370-XA (eXtended Architecture) has been introduced which allows 31-bit addressing, thus greatly enhancing the virtual storage available to a single user. However, the two environments, S/370 and S/370-XA, are not fully compatible. More specifically, the program loader available prior to this invention deals with one architecture and assumes that all programs are executable once loaded. Since the one architecture supported is S/370 architecture, which does not include the concepts of multiple addressing and residency modes, it includes no addressing or residency mode processing. Programs are loaded into fixed, non-relocatable addresses and executed with no addressing mode switching.

SUMMARY OF THE INVENTION

It is therefore an object of the present invention to provide a new program loader which takes advantage of computer architectures that support the concepts of multiple addressing and residency modes.

It is another object of the invention to provide a program loader which has the ability to load and execute both programs that are architecuturally dependent and programs that have no architecture dependencies.

It is a further object of the invention to provide a program loader which has the capability to dynamically and interactively override a program's addressing mode and residency mode at any point in time of the load process.

It is yet another object of the invention to provide the program loader with the ability to control whether previously loaded programs are to remain in storage along with a program that is currently being loaded.

According to the invention, an architecture independent program loader provides areas of addressing and residency mode processing, residency mode based program relocation and computer architecture sensitivity. The architecture independent program loader validates addressing and residency modes, relocates the program during the load based on the residency mode and assures that the program which is to be loaded is executable in the virtual machine architecture within which it is being loaded. In addition, it provides facilities to allow programs with different addressing modes to work together.

BRIEF DESCRIPTION OF THE DRAWINGS

The foregoing and other objects, aspects and advantages of the invention will be better understood from the following detailed description of a preferred embodiment of the invention with reference to the drawings, in which:

FIG. 8 is a memory map illustrating the possible combinations of program residence (RMODE) and addressing modes (AMODE) and the different methods that can be used by the program to invoke another program of the same or different addressing/residency mode.

DETAILED DESCRIPTION OF A PREFERRED EMBODIMENT OF THE INVENTION

The invention will be described in terms of a preferred embodiment which constitutes the best mode for the practice of the invention. The preferred embodiment contemplates the use of IBM's Conversational Monitor System (CMS) product and Virtual Machine System Product (VM/SP) running on IBM's S/370 and S/370-XA computers. However, it should be understood that the concepts described have wider application and may find advantageous use in other system products running in other environments.

IBM S/370 architecture permits only 24-bit addressing and limits address space to 16 Mb (megabytes). The newer IBM S/370-XA architecture permits 31-bit addressing and allows a potential address space of 2 Gb (gigabytes), although the VM/XA SP Control Program limits address space to 999 Mb. This is most useful, for example, for scientific and engineering users who have a need for 31-bit addressing and large virtual machines. In S/370-XA architecture, both 24-bit and 31-bit addressing can be used by a program. This feature allows a program to migrate to the new architecture and still be executed without modification using 24-bit addressing. Programs may use this dual-addressing feature by specifying two new options on some CMS commands to set the program attributes. These options are Addressing Mode (AMODE) and Residency Mode (RMODE). By specifying AMODE, the user specifies whether 24-bit or 31-bit addressing is to be used during the execution of the program. An AMODE of 24 indicates that 24-bit addressing must be used during execution. An AMODE of 31 indicates that 31-bit addressing is to be used. An AMODE of ANY indicates a program that can be invoked in either 24-bit or 31-bit addressing mode. Residency Mode (RMODE) indicates the location where the program can be loaded in the virtual machine address space. An RMODE of 24 indicates that the program must be loaded below the 16-Mb line. An RMODE of ANY indicates that the program may be loaded either above or below the 16-Mb line.

Figure 1:
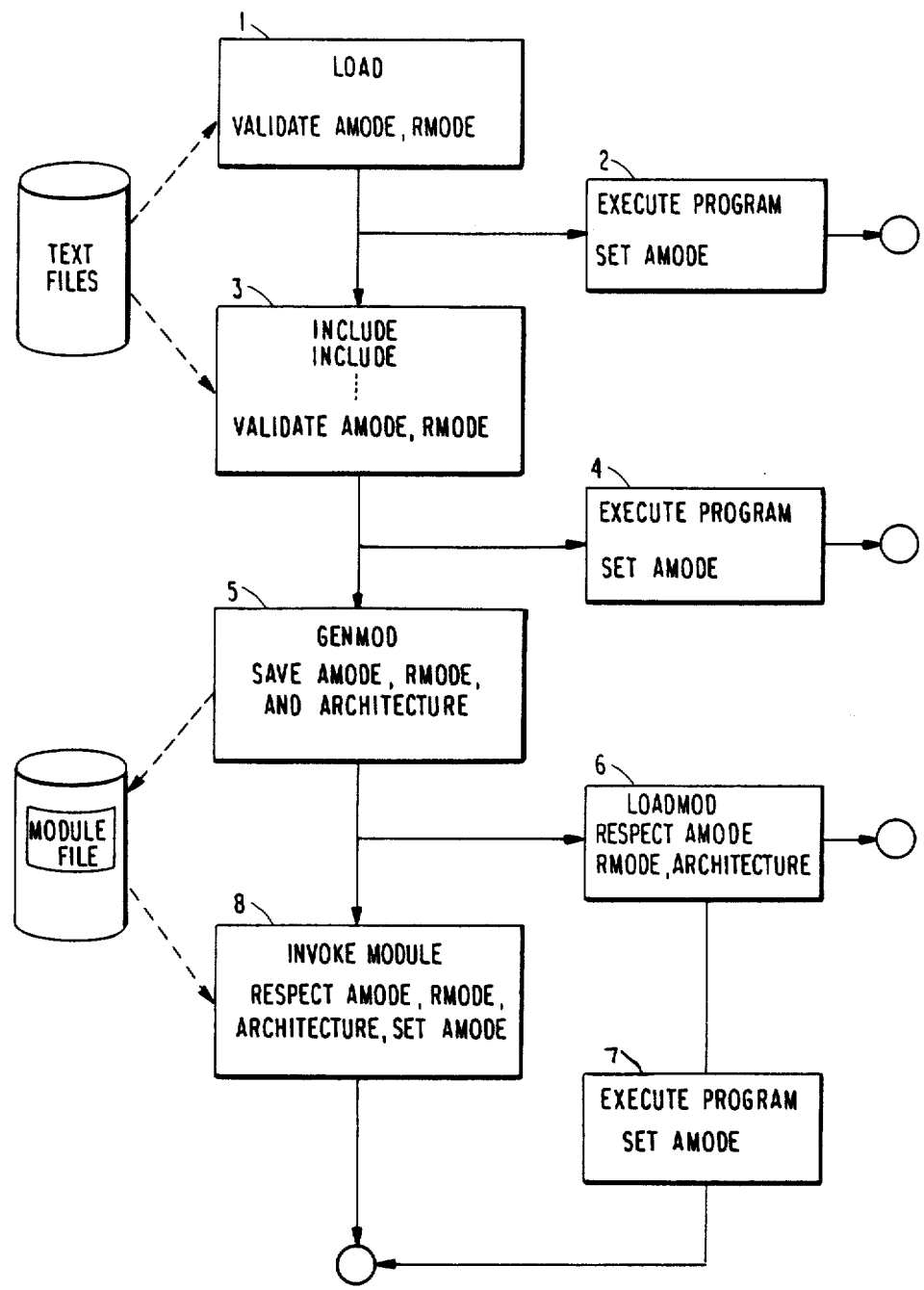
FIG. 1 is a block diagram showing the process by which a user employs the command structure of the architecture independent program loader according to the invention.

Referring now to the drawings, and more particularly to FIG. 1, there is shown in block diagram form the procedure a user follows in the practice of the invention. The user first issues the LOAD command, as indicated by function block 1. The loader loads the program (a TEXT file) into storage validating the Addressing Mode (AMODE) and Residency Mode (RMODE). In function block 2, the user executes the program via the START command. The addressing mode is set before the program begins execution. In function block 3, the user executes one or more INCLUDE commands. The loader reads each TEXT file specified into storage forming a single aggregate program, with the AMODE and RMODE validated. The user executes the program via the START command, as indicated in function block 4. In function block 5, the user issues the GENMOD (Generate Module) command to create a MODULE program from the aggregate program created in storage by the steps performed in function blocks 1 and 3. The program is stored on disk, including the AMODE, RMODE and its architecture requirement. The user issues the LOADMOD command in function block 6 to read the MODULE created in function block 5 into storage. The loader loads the (relocatable) MODULE into storage at an address determined by the MODULE's RMODE. If the program cannot execute in the virtual machine due to an architecture mismatch, the load is rejected. In function block 7, the user executes the program via the START command. The AMODE is set before the program begins execution. In function block 8, the user invokes the MODULE created in function block 5 by invoking it by name. The program is loaded as in function block 6 and automatically executed as in function block 7.

Figure 2:
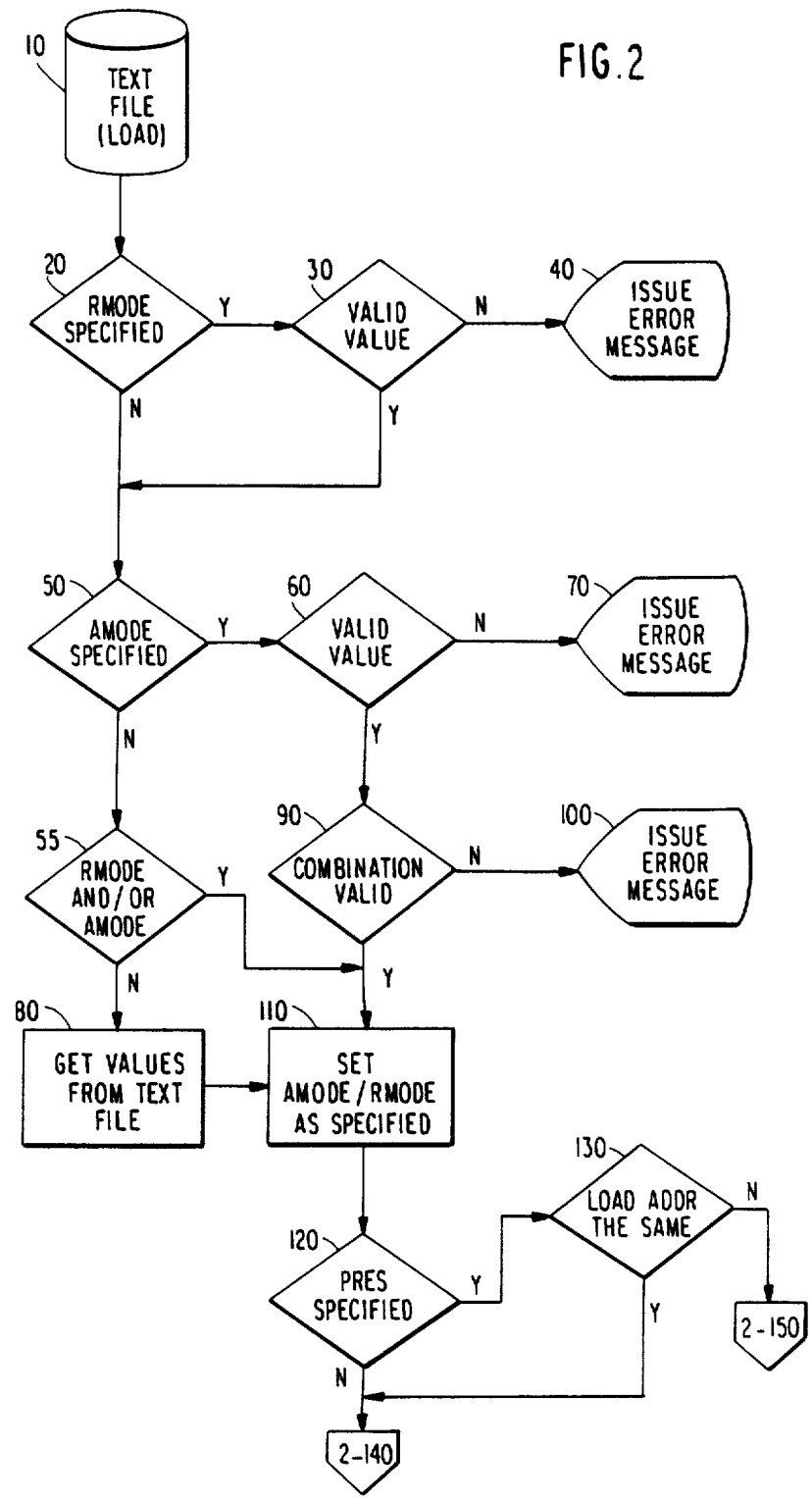
FIG. 2 is a flow diagram showing how the CMS LOAD command processes and assigns the Residency Mode (RMODE) and Addressing Mode (AMODE) attributes to a TEXT file that is to be loaded into virtual storage.

The logic of the flow diagram shown in FIG. 2 illustrates how the CMS LOAD command processes and assigns the Residency Mode (RMODE) and Addressing Mode (AMODE) attributes to a TEXT file that is to be loaded into virtual storage. Beginning at function block 10, the input storage device contains the TEXT file or files that are to be processed by the LOAD command. Decision function blocks 20 and 50 determine if the RMODE and/or AMODE were specified as OPTIONS on the LOAD command. If RMODE and/or AMODE was specified, the values associated with them are checked for validity in decision blocks 30 and 60, respectively. The valid values for AMODE are 24, 31 or ANY, and the valid values for RMODE are 24 and ANY.

If either value was invalid, the function blocks 40 and/or 70 indicate an error message will be generated. If both AMODE and RMODE are each validly specified, a test must be made in decision block 90 to determine if their combination is valid, and if it is not, an error message will be generated in function block 100. The only invalid combination is AMODE 24 and RMODE ANY.

If AMODE was not specified, decision block 55 tests whether RMODE was specified. If RMODE was also not specified, then both the AMODE and RMODE values are obtained from the text file in function block 80. If RMODE and/or AMODE were specified on the LOAD command, tested by function blocks 20 and 50, then each logic path reaches function block 110 where the RMODE and AMODE are set as specified or defaulted.

Once a valid combination has been determined and set, a test is made in decision block 120 to determine if the PRES (preserve) option was specified on the LOAD command. If not, then the previously loaded program is cleared from storage in function block 140 in FIG. 3; otherwise, a further test is made in decision block 130 to determine if the LOAD address is the same as the previously loaded program. If the two addresses are the same, then the previously loaded program is cleared from storage in function block 140 in FIG. 3; otherwise, control goes to function block 150 in FIG. 3.

Figure 3:
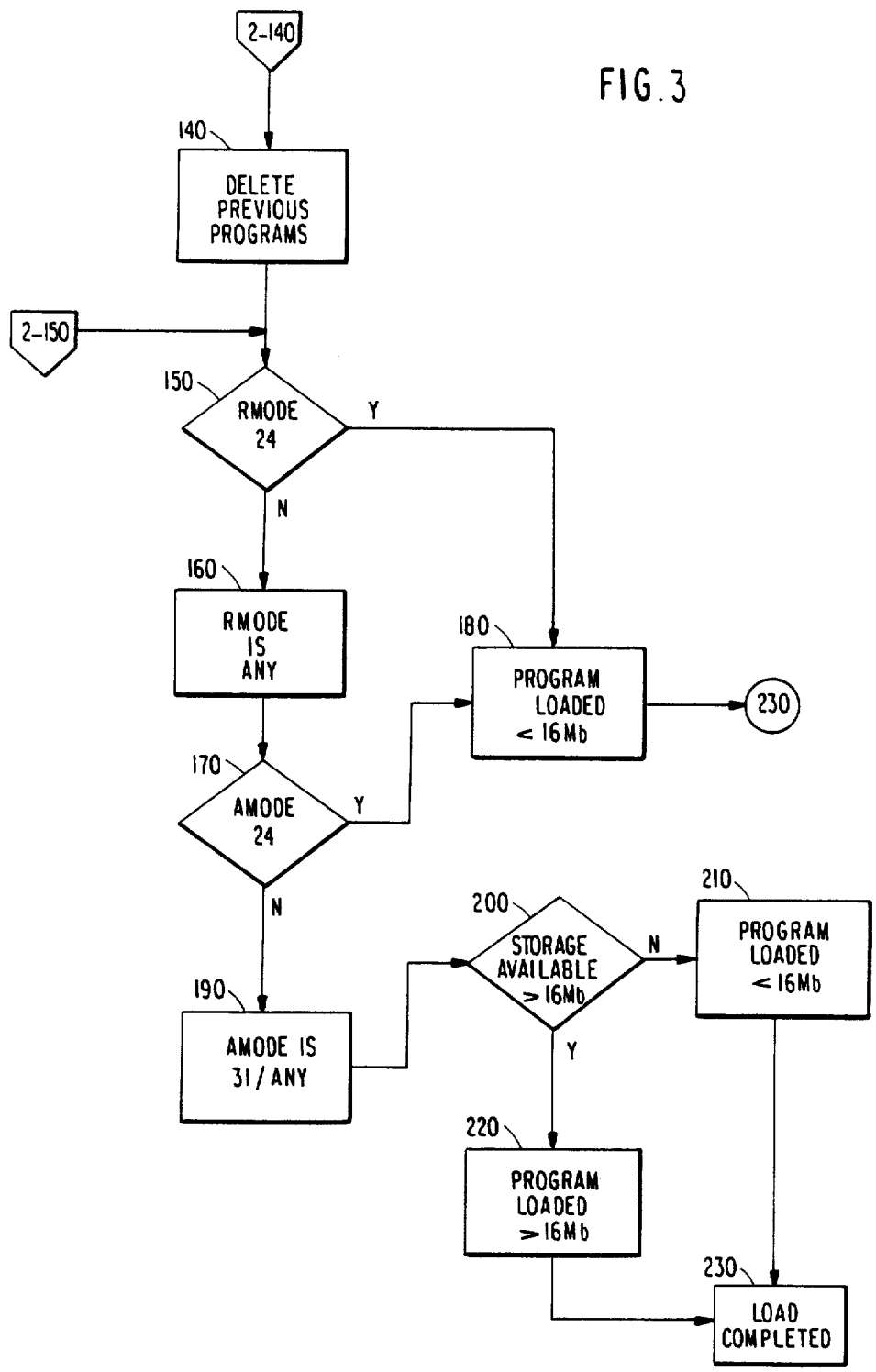
FIG. 3 is a flow diagram showing how the CMS LOAD command next determines if previously loaded programs are to be deleted from storage and where the user TEXT file(s) are to be loaded into virtual storage.

The logic of the flow diagram shown in FIG. 3 illustrates how the CMS LOAD command next determines if previously loaded programs are to be deleted from storage and where the user TEXT file(s) are to be loaded into virtual storage. A test is made in decision block 150 to determine if RMODE was set to 24, and if so, the text file is loaded below 16 Mb in function block 180. If the test in decision block 150 is negative, RMODE is determined to be ANY in function block 160, and a test is made in decision block 170 to determine if AMODE is 24. If so, the text file is loaded below 16 Mb in function block 180; otherwise, AMODE is determined to be 31 or ANY in function block 190. In this case, a test is made in decision block 200 to determine if the virtual machine has greater than 16 Mb of storage. If the needed amount of storage is not available above 16 Mb then the program TEXT file will be loaded below 16 Mb in function block 210, but if available, the TEXT file is loaded above 16 Mb in function block 220. In either case, the load process is ended at function block 230.

The GENMOD (Generate Module) command is enhanced to support relocatable modules in a 24-bit or 31-bit addressing environment. It saves the AMODE or RMODE option (or both), if specified, overrides the AMODE or RMODE specified at assembler source creation time or at LOAD time. Programs that need to run in both 24 and 31-bit environments should be generated with the AMODE ANY or 31 and RMODE ANY options. As an additional option, described in more detail hereinbelow, either S/370 or S/370-XA options can be specified. If S/370 option is specified, the program can only run in a S/370 virtual machine. If neither is specified, the module can be executed in either a S/370 or S/370-XA mode machine. For example, if one wants to generate a module that can be used in both environments and is relocatable, the following CMS commands would be used:

LOAD PROG ( RLDSAVE
GENMOD PROG ( AMODE ANY RMODE ANY

Figure 4:
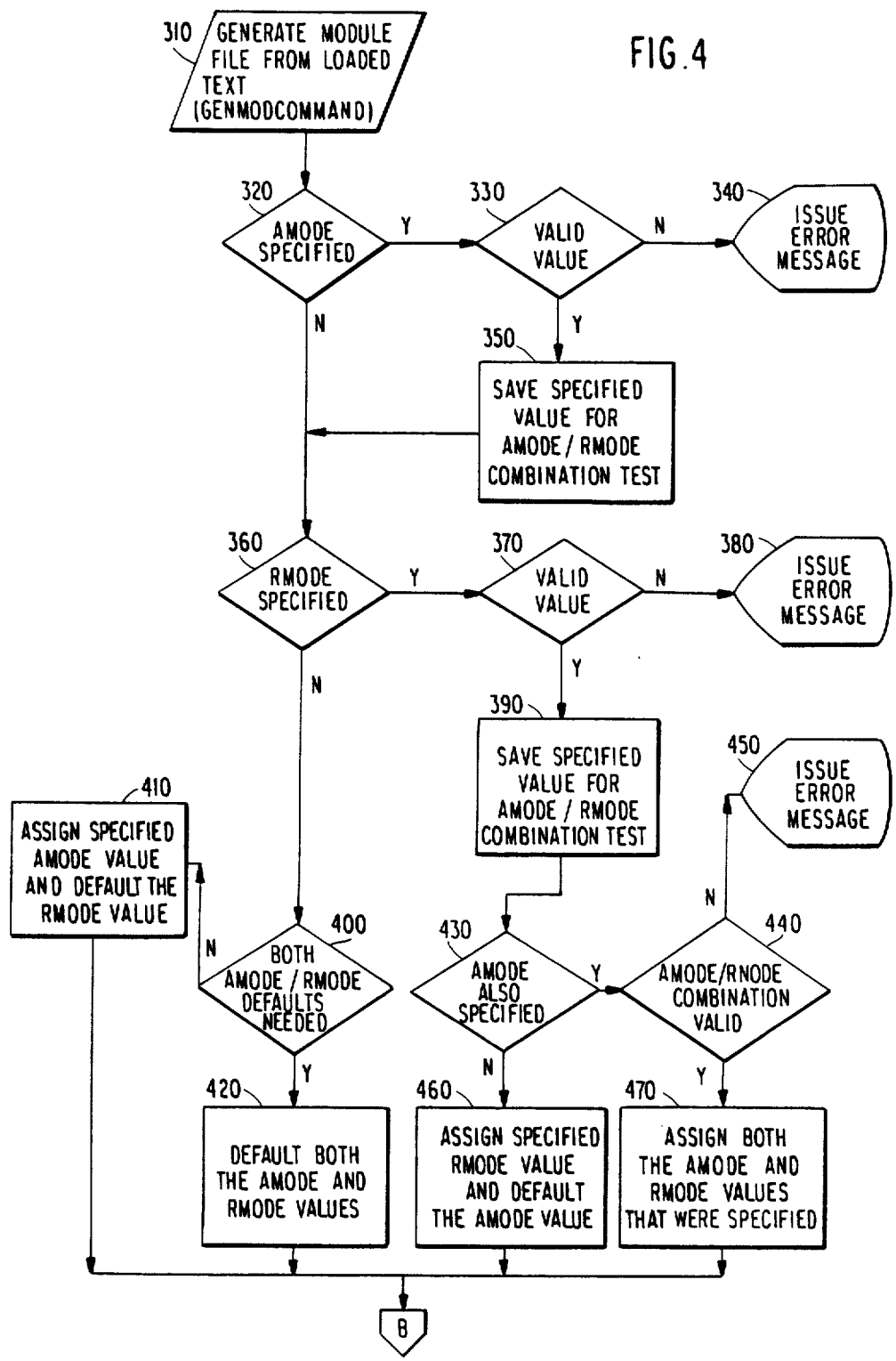
FIG. 4 is a flow diagram showing how the CMS GENMOD command can override the AMODE and/or RMODE attributes of the TEXT file(s) that are currently loaded into virtual storage.

The logic of the flow diagram shown in FIG. 4 illustrates that the invoker of the CMS GENMOD command can override the AMODE and/or RMODE attributes of the text file(s) that are currently loaded into virtual storage. The CMS GENMOD command is used to create a program in MODULE file format from the text file(s) that are currently loaded in virtual storage. This MODULE file is saved on disk and can be executed anytime thereafter. The CMS GENMOD command processes and assigns the AMODE and RMODE attributes to the MODULE file.

When the GENMOD command is issued in function block 310 in FIG. 4, options can be specified that will cause the assignment of that attribute to the MODULE file. If the AMODE option (i.e., AMODE value) is specified in decision block 320, then a test must be made in decision block 330 to determine if it is a valid value. If not, processing stops and an error message is issued at function block 340; otherwise, the value is saved at function block 350 for a possible later AMODE/RMODE combination test, and control goes to decision block 360 where a test is made to determine if the RMODE option is specified. If so, a test must be made in decision block 370 to determine if it is a valid value. If not, processing stops and an error message is issued at function block 380; otherwise, the value is saved at function block 390 for a possible later AMODE/RMODE combination test.

In the case that the RMODE was not specified, then a test must be made in decision block 400 to determine if neither AMODE nor RMODE was specified. Assume first that the AMODE value was specified, then in function block 410, the specified AMODE value is assigned to the MODULE and the RMODE value saved from text processing is assigned to the MODULE. On the other hand, if neither values were specified, then both the AMODE and RMODE values saved during text processing are assigned to the MODULE in function block 420.

Returning to function block 390, if a valid RMODE value as detected and saved, a test must be made in decision block 430 to determine if a value for AMODE was also specified. If not, the specified RMODE value is assigned to the MODULE and the AMODE value saved during text processing is assigned to the MODULE in function block 460. If valid values of AMODE and RMODE were saved in function blocks 350 and 390, a test is made in decision block 440 to determine if the combination of values is valid. The one invalid AMODE/RMODE combination is AMODE 24 and RMODE ANY. If this combination was specified, then the GENMOD command is terminated and an error message is issued at function block 450. However, if the combination is valid, then the specified values for AMODE and RMODE are assigned to the MODULE in function block 470.

Figure 5:
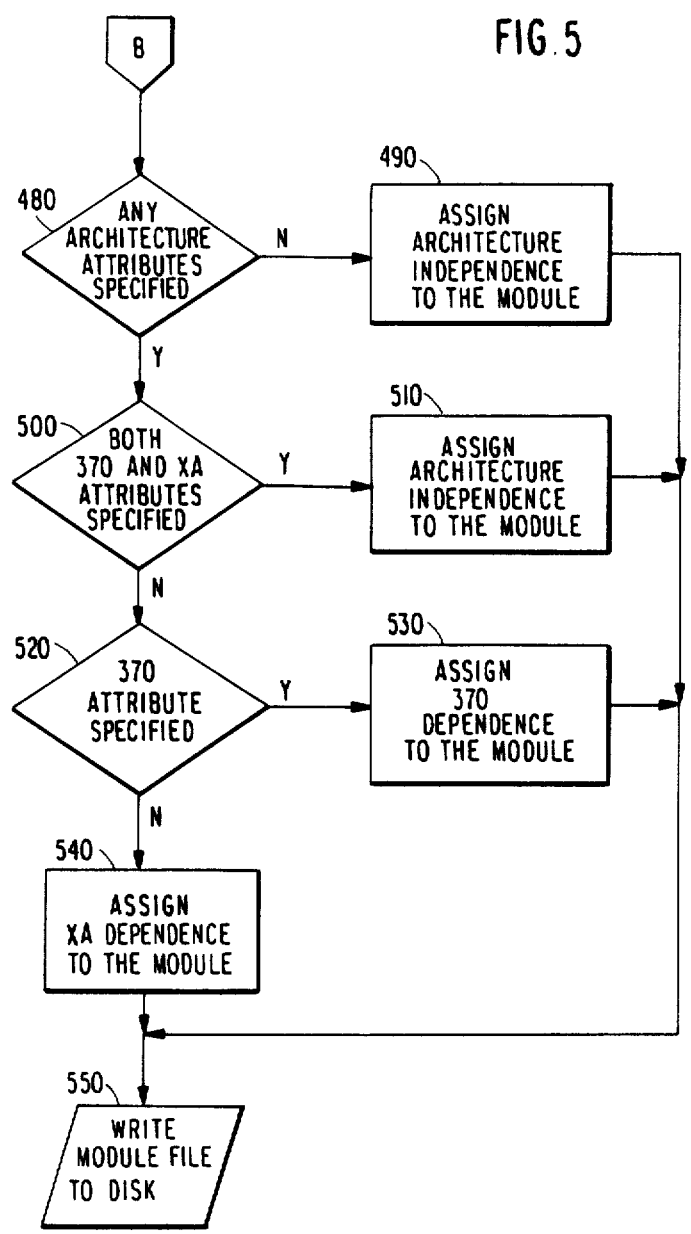
FIG. 5 is a flow diagram showing that the issuer of the CMS GENMOD command can assign architecture dependence or architecture independence to a created MODULE file.

The logic of the flow diagram of FIG. 5 illustrates the process by which the issuer of the CMS GENMOD command can assign architecture dependence or architecture independence to the created MODULE file. The CMS GENMOD command processes and assigns an architecture attribute to the MODULE file.

After assignment of the AMODE and RMODE attributes, the next MODULE attribute to be assigned is the S/370 and/or S/370-XA architecture attribute. The architecture attribute indicates whether the MODULE is dependent on one or the other architecture or whether the module has no architecture dependencies. If a MODULE lists no architecture dependencies, then that program can be executed in either a S/370 mode or a S/370-XA mode virtual machine. If a MODULE lists S/370 as an architecture attribute, then it can only be executed in a S/370 mode virtual machine. Similarly, if the MODULE lists S/370-XA as an attribute, then it can only be executed in a S/370-XA mode virtual machine.

With reference to FIG. 5, a check is first made in decision block 480 to determine if either option, S/370 or S/370-XA, has been specified in GENMOD. If neither option was specified, then architecture independence is assigned in function block 490 as a MODULE attribute. The same result obtains if both S/370 and S/370-XA attributes are specified as determined by the test in decision block 500; that is, an architecture independence attribute is assigned to the MODULE in function block 510. If only one of the S/370 or S/370-XA options was specified as determined in decision blocks 480 and 500, then a test must be made in decision block 520 to determine if the S/370 attribute was the one specified. If so, the S/370 dependence attribute is assigned to the MODULE in function block 530; otherwise, the S/370-XA dependence attribute is assigned to the MODULE in function block 540. Once an architecture attribute has been assigned to the MODULE, the MODULE file is written to disk in function block 550.

Figure 6:
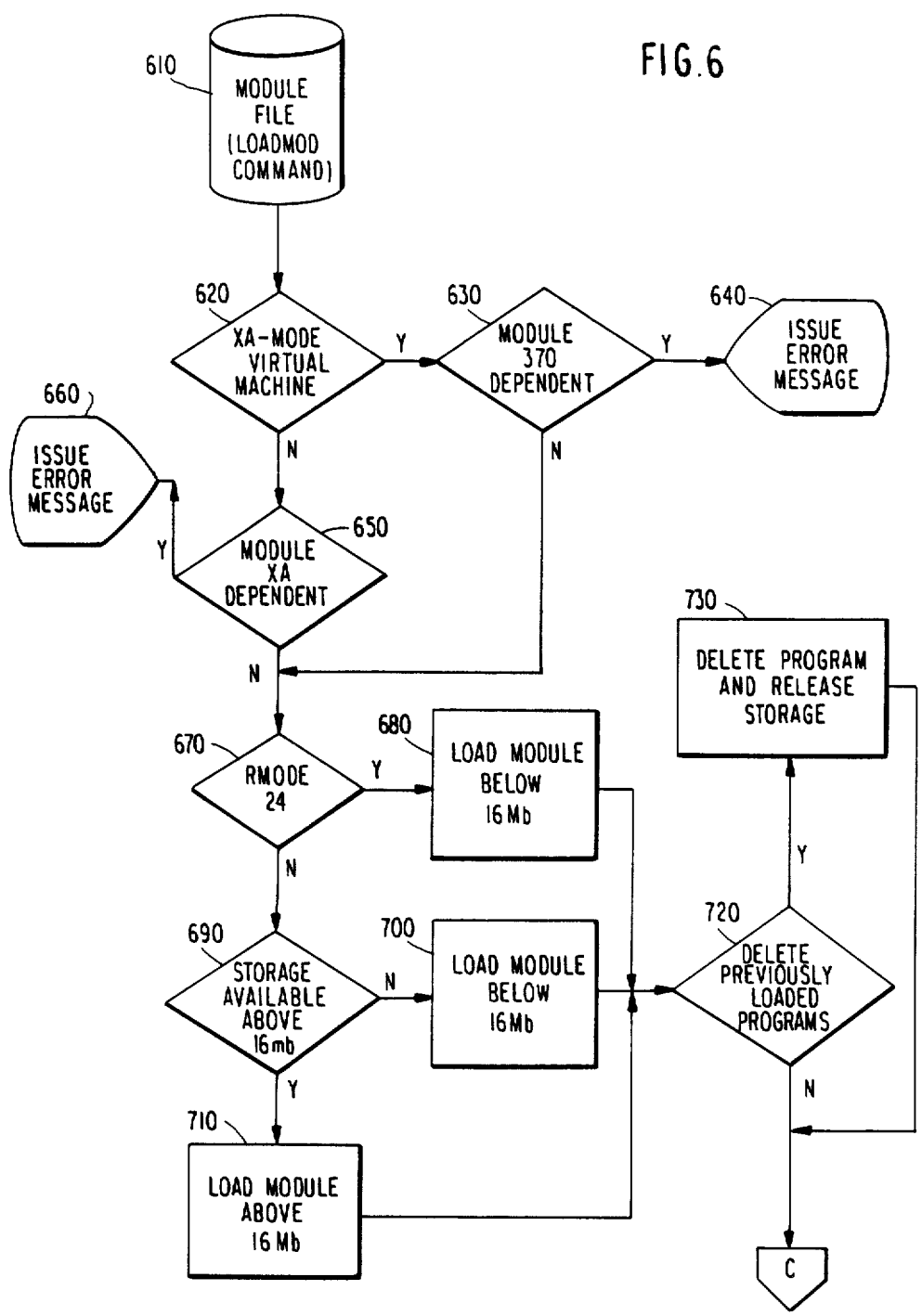
FIG. 6 is a flow diagram showing the logic of whether or not a CMS MODULE file can be loaded into virtual storage based on the architecture attribute specified at GENMOD command invocation, how the MODULE is loaded into virtual storage based on the RMODE attribute, and whether previously loaded programs are to be deleted from virtual storage.

The logic of the flow diagram of FIG. 6 illustrates whether or not a CMS MODULE file can be loaded into virtual storage based on the architecture attribute specified at GENMOD command invocation. It further illustrates how the MODULE is loaded into virtual storage based on the RMODE attribute assigned during the GENMOD command processing and also whether previously loaded programs are to be deleted from or are to remain in virtual storage.

In FIG. 6, when the LOADMOD command is issued at function block 610, whether externally or from within CMS, certain module attributes must be checked to determine if the MODULE can be loaded, where the MODULE can be loaded, and whether previous programs can remain or be deleted from storage. The first test made in decision block 620 is to determine if the machine is currently executing in S/370-XA mode. If it is in S/370-XA mode, a test is made in decision block 630 to determine if the MODULE to be loaded is S/370 architecture dependent. If the MODULE file to be loaded tests positively for an architecture attribute of S/370, then the LOADMOD command is terminated and an error message is issued in function block 640. If the virtual machine is not in S/370-XA mode but is in S/370 mode, then MODULE is tested in decision block 650 to determine if it has an S/370-XA architecture attribute. If so, the LOADMOD command is terminated and an error message is issued in function block 660.

Once the architecture attribute is processed without error, the next step is to load the (relocatable) MODULE file into virtual storage based on the RMODE attribute. A test is made in decision block 670 to determine if the MODULE has an RMODE 24 attribute, and if so, storage is obtained for and the executable portion of the MODULE file is loaded at function block 680 below the 16 Mb address. Otherwise, the RMODE attribute is ANY, and the MODULE can reside anywhere in the virtual storage address space; i.e., either above or below the 16 Mb address. A test must be made in decision block 690 to determine if storage is available above the 16 Mb address. This is possible only in a S/370-XA mode virtual machine with 17 Mb or more of defined storage. If the test in decision block 690 is negative, as is always the case in a S/370 mode virtual machine, then the MODULE is loaded below the 16 Mb address in function block 700; but if positive, the MODULE is loaded above the 16 Mb address in function block 710.

After the MODULE file has been loaded into storage, a test is made in decision block 720 to determine if previously loaded programs (TEXT and MODULES) are to remain in or be deleted from storage. Input to this test is the PRES|NOPRES (Preserve or No Preserve) option on LOADMOD and the MAP|NOMAP and/or STR|NOSTR (Storage Init or No Storage Init) MODULE attributes. If the NOPRES option was specified or defaulted on LOADMOD and the MODULE has an attribute of either MAP or STR, then all previously loaded programs are deleted from virtual storage in function block 730. In any case, control then goes to function block 740 in FIG. 7.

Once the module has been loaded into storage and previous programs have been handled (i.e., deleted or preserved), the MODULE program can be executed. If the LOADMOD command was issued externally, then the MODULE file can be executed via the CMS START command. If the LOADMOD command was issued internally by the CMS SVC handler (DMSITS), this indicates that the MODULE was invoked via its file name and will both be loaded into storage and executed.

Figure 7:
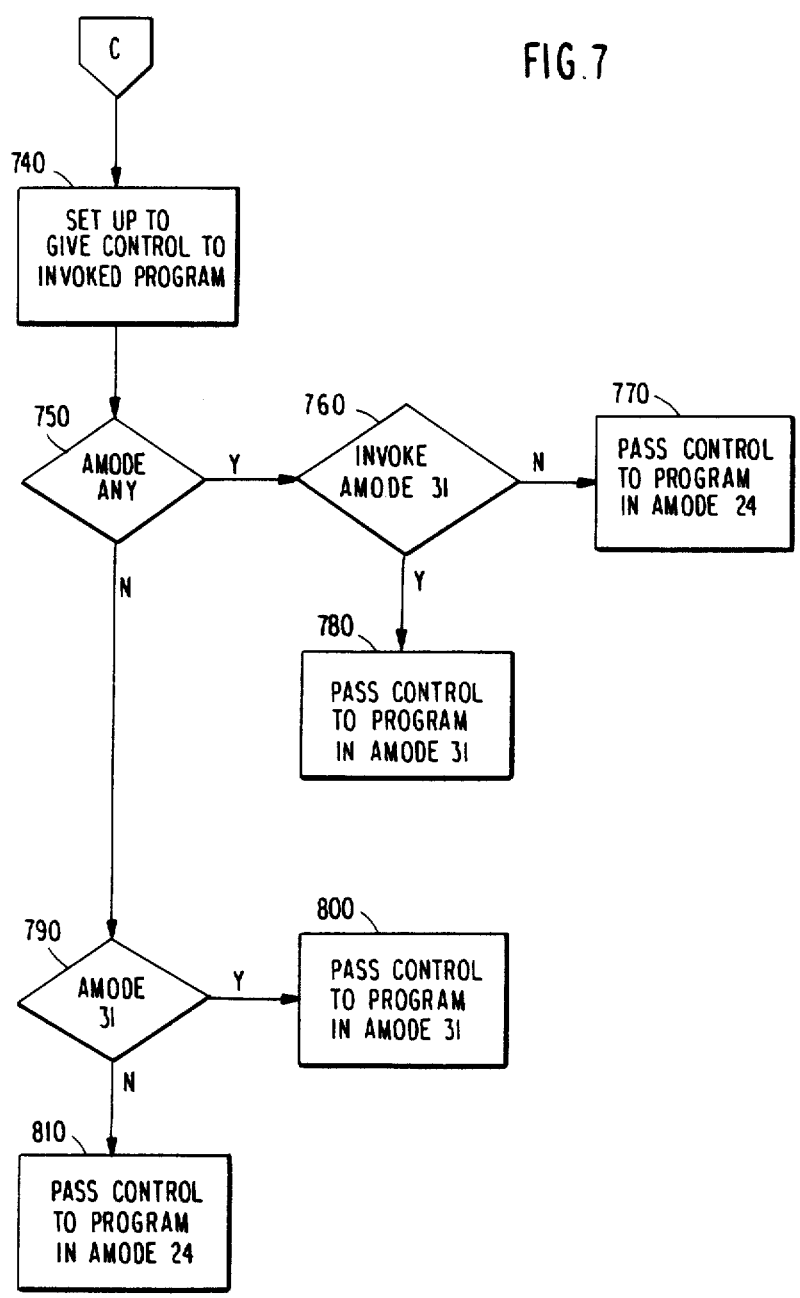
FIG. 7 is a flow diagram showing how a MODULE file receives control in the Addressing Mode that was requested.

FIG. 7 illustrates the logic that is followed in determining which addressing mode, 24 or 31, the invoked MODULE is to receive control. Preliminary functions, such as saving registers and obtaining a program save area when the MODULE is invoked via its file name are performed in function block 740. After the preliminary functions, a test is made in decision block 750 for the AMODE ANY attribute. If the MODULE has an AMODE ANY attribute, then the MODULE is to receive control in the same addressing mode as the program that requested its execution (i.e., the invoker). The invoker's AMODE attribute is tested in decision block 760, and if it is not 31, then the invoked MODULE receives control in addressing mode 24 in function block 770; otherwise, control is passed to the MODULE in addressing mode 31 in function block 780.

If AMODE is not ANY as determined in decision block 750, then a test is made in decision block 790 to determine if the AMODE attribute is 31. If so, control is passed to the MODULE in addressing mode 31 in function block 800; otherwise, control is passed in addressing mode 24 in function block 810.

FIG. 8 illustrates the possible combinations of program residence (RMODE) and addressing (AMODE) modes and the different methods that can be used by the program to invoke another program of the same or different addressing/residency mode. In the case of virtual machine I, programs A and B both reside in the machine at address less than 16 Mb. Program A addressing mode (AMODE) is 24, and program B addressing mode (AMODE) is 31. Program A invokes program B either by issuing the AMODESW CALL macro to set the addressing mode to 31 for program B or by issuing the AMODESW CALL macro to program B and then program B will issue the AMODESW SET macro to set the AMODE to 31 inline. Program B can return to program A via the AMODESW RETURN macro.

In virtual machine II, program A resides in the machine at an address that is less than 16 Mb, and program B resides in the machine at an address that is greater than 16 Mb. Program A addressing mode (AMODE) is 24, and program B addressing mode (AMODE) is 31. Program B invokes program A by either issuing the AMODESW CALL macro to set the addressing mode to 24 for program A or issuing the AMODESW CALL macro to program A and then program A will issue the AMODESW SET macro to set the AMODE to 24 inline. Program B can return to program A via the AMODESW RETURN macro.

In virtual machine III, programs A, B and C reside in the machine at an address that is greater than 16 Mb, and program D resides in the machine at an address that is less than 16 Mb. All programs A, B, C, and D can be invoked by each other in any sequence using the AMODESW CALL macro, but no switching of AMODE will be required as all programs were created with an AMODE of 31-bits.

In virtual machine IV, programs A and B reside in a machine that only contains 16 Mb of storage. Since this machine only contains 16 Mb of storage, program B invokes program A using the AMODESW CALL macro and no switching will be done.

The concepts implemented in the mainframe environment represented by the IBM S/370 and S/370XA family of computers may be implemented in other environments to realize advantages in compatibility between computers. For example, the Motorola 68000/68020 family of microprocessors and the Intel 8086/80286/80386 family of microprocessors provide environments not unlike the IBM S/370 and S/370-XA environment. The Motorola 68000 microprocessor has a 16-bit address bus, while the 68020 has a 32-bit address bus. The former is used in a number of popular microcomputers such as the Apple Macintosh TM, and the latter is the defacto standard in UNIX TM based minicomputers from such companies as Sun Microsystems and Apollo Computers. The Intel 8086 and 80286 microprocessors have 16-bit address buses, while the 80386 has a 32-bit address bus. The Intel series of microprocessors are used in the IBM Personal System 2 (PS/2) family of computers. Virtual machine operation is possible in all but the Intel 8086 microprocessor.

Applying the concepts of the subject invention to other and different environments than the preferred IBM S/370 and S/370-XA mainframe computer environment is therefore a simple extension of the teachings of the invention. Generally stated, a program loader would be provided with options that would recognize multiple addressing and residency modes and architecture dependencies in the programs to be loaded and executed. The greatest advantage is achieved when different addressing modes are accommodated in the same program. Thus, while the invention has been described in terms of a single preferred embodiment, those skilled in the art will recognize that the invention can be practiced with modification in other and different environments within the spirit and scope of the appended claims.

Having thus described our invention, what we claim as new and desire to secure by Letters Patent is as follows:

1. In a virtual machine operating system running on a computer belonging to a family of computers having different architectures, a method performed by said computer of loading a program which has either first or second addressing widths in a virtual machine running on said computer comprising the steps of:
   testing a load command for a residency mode attribute corresponding to either said first addressing width or any addressing width;
   testing the load command for an addressing mode attribute corresponding to said first or second addressing widths or any addressing width;
   determining from stored parameters whether specified residency mode and addressing mode attributes are valid and whether a combination of specified residency mode and addressing mode attributes are valid for said virtual machine;
   loading the program in an address space below a predetermined address limit when the residency mode has an attribute corresponding to said first addressing width;
   loading the program in an address space below said predetermined address limit when the residency mode has an attribute corresponding to any addressing width and the addressing mode has an attribute corresponding to said first addressing width; and
   loading the program in an address space above said predetermined address limit when the residency mode has an attribute corresponding to any addressing width and the addressing mode has an attribute corresponding to said second addressing width or any addressing width and sufficient memory is available.

2. The method of loading a program as recited in claim 1 wherein if either residency or addressing mode attributes is not specified in the load command, further comprising the steps of:
   reading a text file comprising said program to determine the residency and addressing modes; and
   setting the residency and addressing modes as specified in the text file.

3. The method of loading a program as recited in claim 1 further comprising the steps of:
   testing for a preserve option in response to said load command; and
   deleting any programs previously loaded into memory when the preserve option is not present.

4. The method of loading a program as recited in claim 3 further comprising the steps of:
   testing the load command to determine if the program to be loaded is to be loaded at an address where a previously loaded program text resides in memory; and
   deleting the previously loaded program text when the program to be loaded is to be loaded at said address.

5. In a virtual machine operating system running on a computer belonging to a family of computers having different architectures, a method performed by said computer of generating a program module in response to a generate module command which may have specified options of first or second addressing widths in a virtual machine running on said computer comprising the steps of:
   testing the generate module command for a specification of an addressing mode attribute of said first, second or any addressing widths;
   testing the generate module command for a specification of a residency mode attribute of said first or any addressing widths;
   determining from stored parameters whether specified residency mode and addressing mode attributes are valid and whether a combination of specified residency mode and addressing mode attributes are valid for said virtual machine;
   issuing an error message in response to said generate module command when any of the specified addressing and residency modes or the combination of those modes are not valid;
   assigning specified addressing and residency mode attributes to said program module; and
   writing said program module to storage with said assigned addressing and residency mode attributes.

6. The method of generating a program module as recited in claim 5 further comprising the steps of:
   testing the generate module command for a specification of architecture dependency; and
   assigning a specified architecture dependency attribute to said program module, or if no architecture dependency is specified, assigning an architecture independency attribute to said program module before writing said program module to external storage.

7. The method of generating a program module as recited in claim 5 wherein when either of said addressing mode or said residency mode is not specified, further comprising the step of assigning a default addressing or residency mode attribute to said program module before writing to external storage.

8. In a virtual machine operating system running on a computer belonging to a family of computers having different architectures, a method performed by said computer of loading a program module, which is part of a computer program composed of a plurality of program modules, in memory assigned to a virtual machine running on said computer, each of said modules having first or second addressing widths, said method comprising the steps of:
   testing for the type of architecture of said virtual machine in response to a load module command;

testing said program module for a computer architecture dependency attribute;

testing the load module command for a residency mode attribute corresponding to said first addressing width;

loading the program module in an address space below a predetermined address limit when the architecture of said virtual machine and the architecture dependency of the program module are compatible and the residence mode attribute of the program module corresponds to said first addressing width; and loading the program module in an address space above said predetermined address limit when sufficient memory is available and the architecture of said virtual machine and the architecture dependency of the program module are compatible and if the residence mode attribute of the program module corresponds to said first addressing width.

9. The method of loading a program module as recited in claim 8 further comprising the steps of:

setting up said virtual machine to give control to said program module loaded in memory when said program module is invoked by and execute command;

testing said program module for an addressing mode attribute corresponding to said second addressing width or any addressing width in response to said execute command; and passing control to said program module in an addressing mode corresponding to said first addressing width when the addressing mode attribute corresponds to neither said second addressing width or any addressing width.

10. The method of loading a program module as recited in claim 8 further comprising the steps of:

detecting when the architecture of said virtual machine and the architecture dependency of the program module are incompatible; and issuing an error message in response to said load module command when the architecture of said virtual machine and the architecture dependency of the program module are incompatible.

11. The method of loading a program module as recited in claim 8 further comprising the steps of:

testing for a preserve option attribute in response to said load module command; and if the preserve option attribute is not present, deleting any programs previously loaded into memory.

12. The method of loading a program module as recited in claim 8 further comprising the steps of:

testing the load module command to determine if the program module to be loaded is to be loaded at an address where a previously loaded program text or non-relocatable program module resides in memory; and if the program to be loaded is to be loaded at said address, deleting the previously loaded program text or non-relocatable program module.

13. The method of loading a program module as recited in claim 9 further comprising the steps of:

loading a plurality of program modules having differing architecture dependencies and residency modes; and executing a program composed of said program modules by invoking said program modules by a direct branch linkage in the addressing mode of a target program module.

14. The method of loading a program module as recited in claim 9 further comprising the step of dynamically and interactively overriding both the program module's addressing mode and residency mode at any point in the load process.

15. The method of loading a program module as recited in claim 13 further comprising the step of controlling whether previously loaded program modules are to remain in memory along with the program module being loaded.

16. The method of loading a program module as recited in claim 8 further comprising the step of loading both programs that are architecturally dependent and programs that are architecturally independent in memory.

* * * * *